(12) United States Patent
Cella et al.

(10) Patent No.: US 7,390,857 B2
(45) Date of Patent: Jun. 24, 2008

(54) CROSSLINKABLE AND CROSSLINKED POLYMERS

(75) Inventors: James Anthony Cella, Clifton Park, NY (US); Daniel Gerard Colombo, Guilderland, NY (US); Christopher James Kapusta, Duanesburg, NY (US)

(73) Assignee: General Electric Company, Niskayuna, NY (US)

( * ) Notice: Subject to any disclaimer, the term of this patent is extended or adjusted under 35 U.S.C. 154(b) by 250 days.

(21) Appl. No.: 10/928,939

(22) Filed: Aug. 27, 2004

(65) Prior Publication Data

US 2006/0047031 A1   Mar. 2, 2006

(51) Int. Cl.
*C08F 283/01* (2006.01)
*C08G 61/00* (2006.01)

(52) U.S. Cl. .................. 525/421; 525/279; 525/282; 525/404; 525/436; 525/445; 525/455; 525/467; 525/468; 525/535; 525/539

(58) Field of Classification Search .......... 525/421, 525/436, 279, 202, 445, 455, 467, 468, 535, 525/539, 404, 426
See application file for complete search history.

(56) References Cited

U.S. PATENT DOCUMENTS 4,140,816 A * 2/1979 McGinniss .............. 427/498

| 4,578,328 | A | 3/1986 | Kray et al. |
| 5,480,959 | A | 1/1996 | Schmidhauser |
| 6,043,334 | A * | 3/2000 | Kanamaru et al. ....... 430/58.35 |
| 6,067,186 | A | 5/2000 | Dalton et al. |
| 6,107,436 | A * | 8/2000 | Goeb et al. .................. 528/75 |
| 6,126,867 | A | 10/2000 | Kanitz et al. |
| 6,252,557 | B1 | 6/2001 | Plugge et al. |

FOREIGN PATENT DOCUMENTS

| EP | 302484 A | 2/1989 |
| JP | 05320333 | 12/1993 |
| WO | WO 86/04073 A | 7/1986 |

OTHER PUBLICATIONS

Phelan et al., "Fluorescence Characteristics of Cure Products in Bis(maleimide)/Diallylbisphenol A Resin", Macromolecules 1997, 30, 6837-6844.
Shi et al., "Low (Sub-1-Volt) Halfware Voltage Polymeric Electro-optic Modulators Acheived By Controlling Chromophore Shape", Science vol. 288, Apr. 7, 2000, pp. 119-122.
Wang et al., "Design, Synthesis and Characterization of a Novel Substituted Dicyanomethylendihydrofuran Based High-B NLO Chromophore and its Polymers with Exceptionally High Electro-optic Coefficients", Polym. prepr., 39 (2): 1065-1066 (1998).

* cited by examiner

*Primary Examiner*—Ana L Woodward
(74) *Attorney, Agent, or Firm*—Fletcher Yoder

(57) ABSTRACT

Crosslinkable polymeric materials are disclosed useful for the temporal stabilization of a poling-induced noncentrosymmetric host lattice containing guest nonlinear optical chromophores. The materials are also suitable as crosslinkable coatings in the absence of chromophores. Also disclosed is a method of crosslinking such polymeric material.

8 Claims, 4 Drawing Sheets

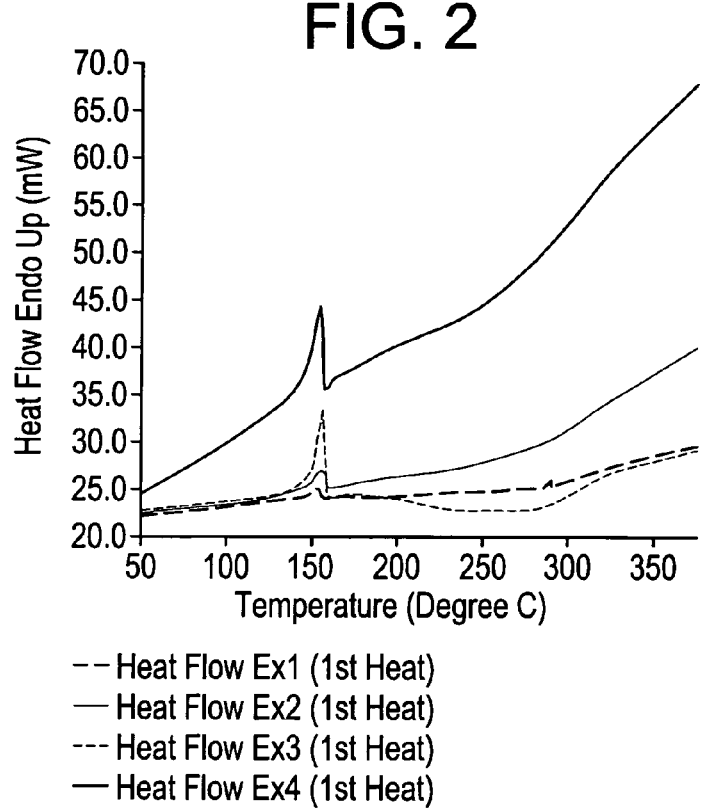
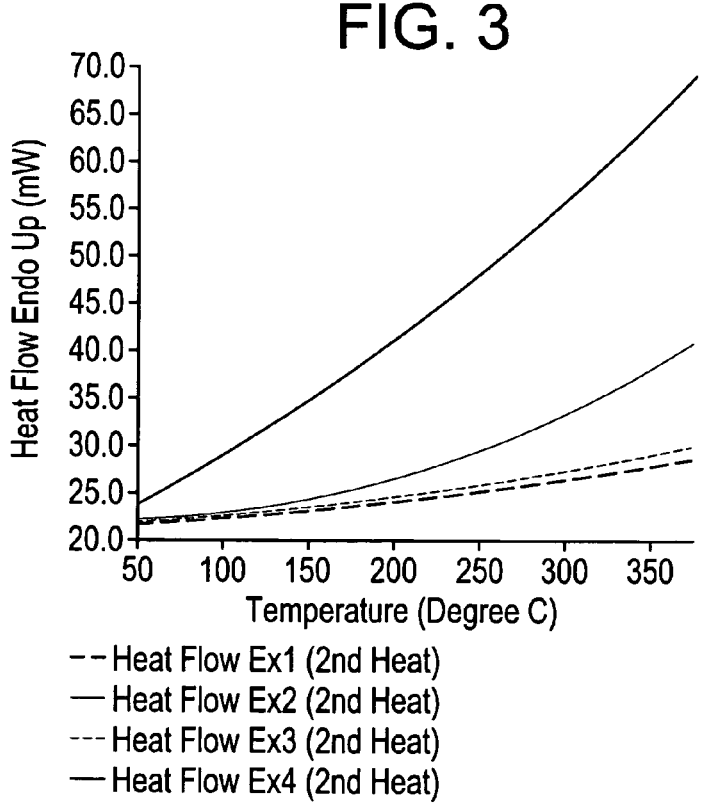

CROSSLINKABLE AND CROSSLINKED POLYMERS

BACKGROUND OF INVENTION

Polymeric thin film electro-optical (EO) modulator devices based on guest nonlinear optical (NLO) chromophores dispersed in a polymeric material are known. The devices function because the NLO chromophores exhibit a high molecular hyperpolarizabity, which when aligned into an acentric dipolar lattice by an applied poling field, increases the EO activity. The performance of such devices is limited or diminished by the randomizing of the acentric order originally imposed on the lattice due to physical events within the polymeric material. These events include polymer creep, polymer glassy behavior above glass transition state, and chromophore/polymer phase segregation and aggregation.

One approach to surmount these problems includes using a polymeric material exhibiting a relatively high glass transition state well above the operating temperature of the device. However, this strategy has been limited because the NLO chromophore has been found to exert a plasticizing effect on the polymeric material, thereby lowering the glass transition temperature of the composite material relative the undoped polymer.

A second approach employs crosslinking the polymeric material to "fix" the orientation of the poled chromophores. Difficulty in controlling the reaction conditions during device fabrication has limited this approach. To be a viable approach, the crosslinking must not occur before poling is complete. Poling is generally conducted at temperatures at or about the glass transition temperature of the polymeric material. Therefore, the crosslinking needs to occur "on demand".

There remains a continuing need for still further improvements in the polymeric materials used to maintain the oriented NLO chromophore lattice.

BRIEF DESCRIPTION OF THE INVENTION

In one embodiment, a method for crosslinking a polymer comprises reacting i) a crosslinkable polymeric material comprising olefin groups and ii) a crosslinking agent comprising electron deficient olefin groups, at a temperature at which crosslinking occurs.

In another embodiment, a method of fabricating a crosslinked polymer comprises mixing a crosslinkable polymeric material, a crosslinking agent, and a chromophore to form a mixture; forming a film from the mixture; aligning the chromophore; and heating the mixture to effect crosslinking reactions between the crosslinkable polymeric material and crosslinking agent.

In yet another embodiment, a method for crosslinking a polymer comprises reacting i) a polycarbonate copolymer prepared from a bisphenol compound comprising two olefin groups and a 4,4'-[1-methyl-4-(1-methylethyl)-1,3-cyclohexandiyl]bisphenol and ii) 1,1'-(methylenedi-4,1-phenylene)bismalimide, 1,4-phenylene bismalimide, 1,4-di-1H-pyrrole-2,5-dione)butane, or a combination thereof, at a temperature at which crosslinking occurs.

In another embodiment, a crosslinkable composition comprises a crosslinkable polymeric material comprising olefin groups; a crosslinking agent comprising electron deficient olefin groups; and a non-linear optical chromophore.

BRIEF DESCRIPTION OF DRAWINGS

FIG. 2 is a graphical representation of the thermal cure of DABPA-co-BHPM polycarbonate copolymer in the presence of BMI (first heat);

FIG. 3 is a graphical representation of the thermal cure of DABPA-co-BHPM polycarbonate copolymer in the presence of BMI (second heat)

DETAILED DESCRIPTION

Described herein are polymeric materials that can be crosslinked to "fix" guest NLO chromophores oriented by electric field poling prior to crosslinking of the polymeric material. The chemical crosslinking reactions subsequent to the induction of acentric order by electric field poling leads to enhanced, long term, thermal stability of the polymeric EO films used to prepare EO devices. The stability is thought to be due to the crosslinks limiting polymer creep and subsequent loss of the chromophores' defined orientation.

Also disclosed herein is a method of crosslinking polymeric materials. The crosslinked polymeric material can maintain an ordered, acentric, dipolar chromophore lattice induced by electric field poling thereby providing both temporal and thermal stability of the EO films when incorporated into EO modulator devices. It has been found that polymeric materials comprising olefin groups can undergo crosslinking under thermal conditions in the presence of an electron deficient olefin-group-containing crosslinking agent. Not wishing to be bound by theory, it is believed that the olefin groups of the crosslinkable polymeric material react with the olefin groups of the crosslinking agent via an ene addition reaction to provide crosslinks. It is further believed that the resulting ene product can undergo a Diels Alder reaction with available olefin groups of the crosslinking agent to provide additional crosslinks.

Figure 1A:
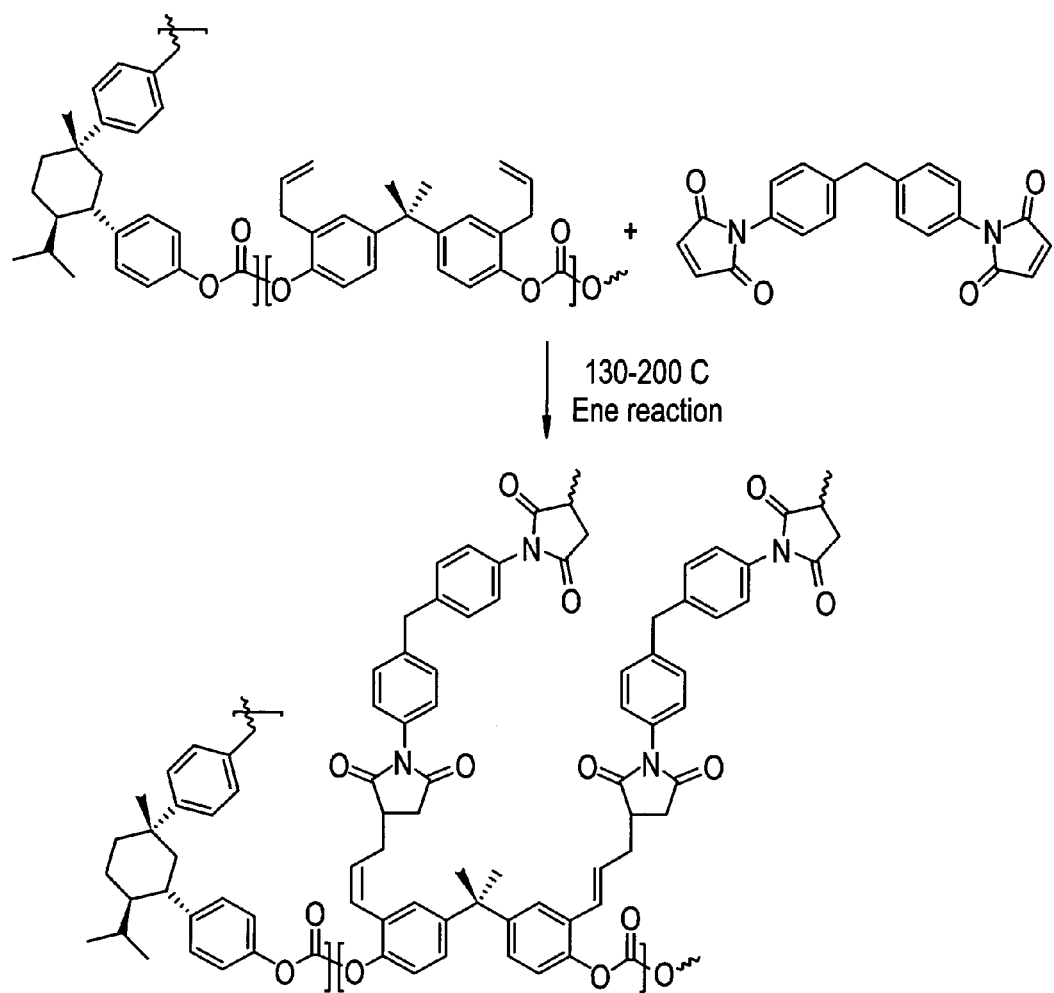
FIGS. 1a and 1b include an idealized thermosetting of DABPA-co-BHPM polycarbonate copolymer via Ene and Diels Alder reactions.
Figure 1B:
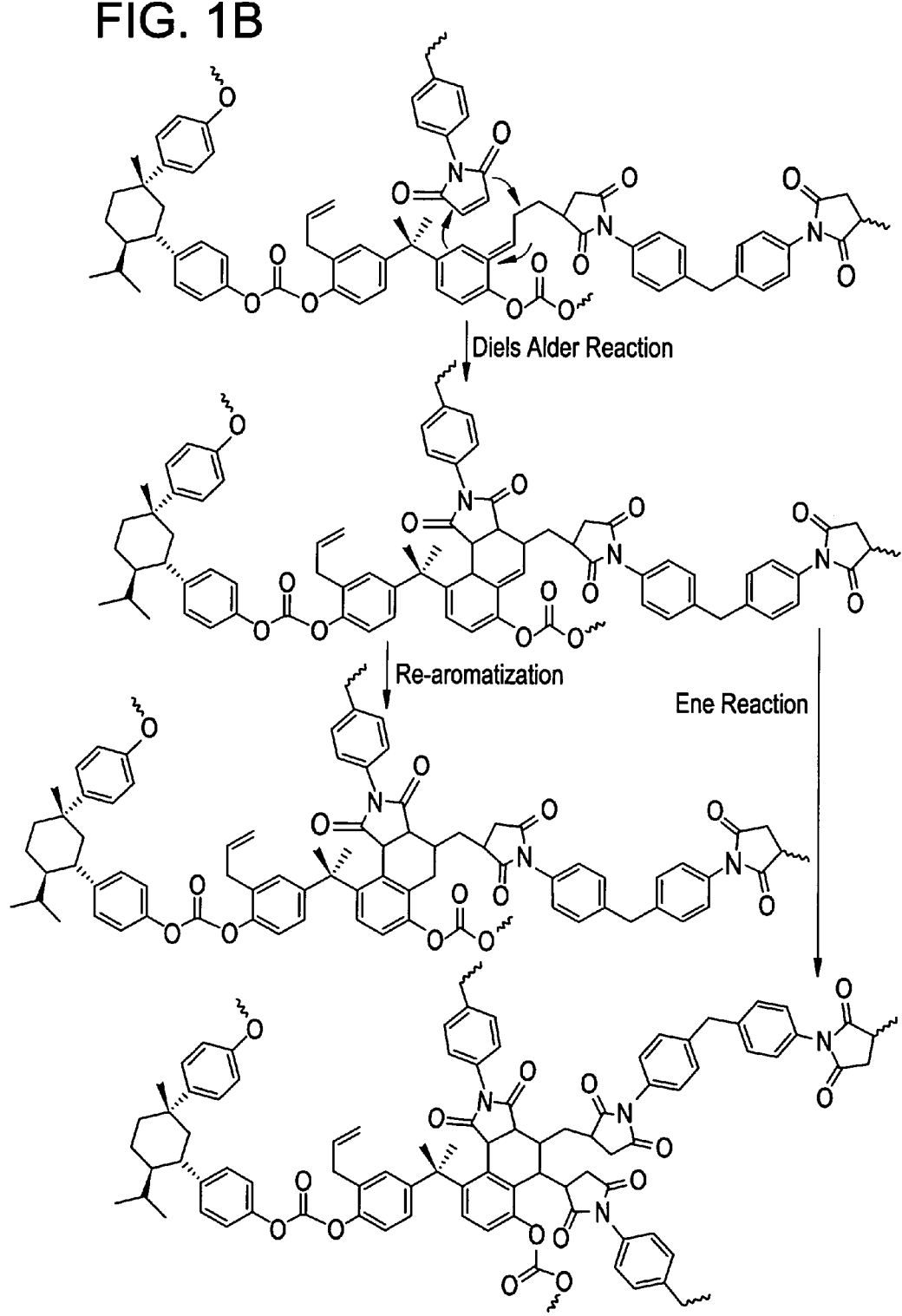
Figure 4:
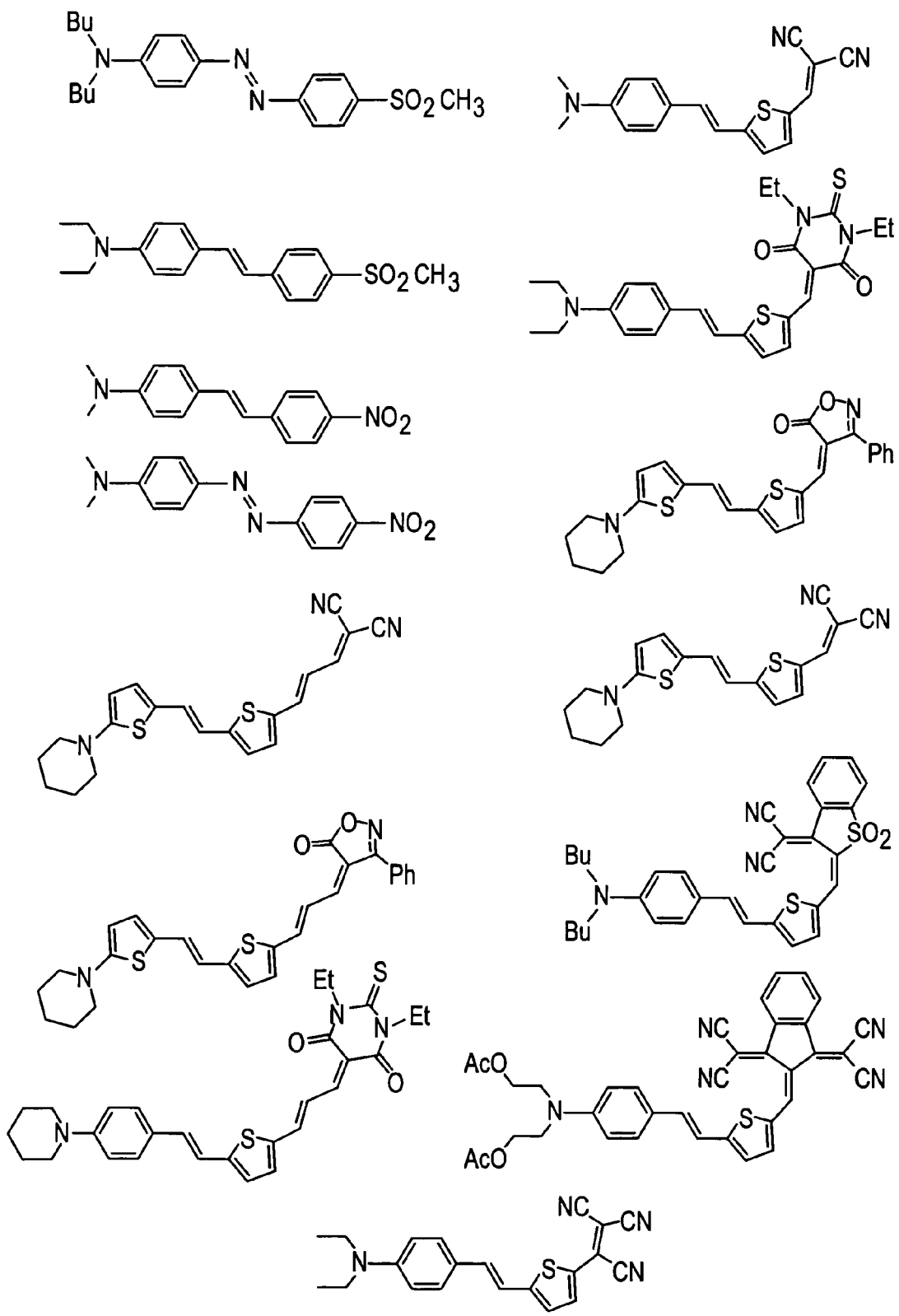
FIG. 4 includes exemplary NLO chromophores.

FIG. 1a provides an idealized crosslinking reaction scheme between a polycarbonate copolymer and 1,1'-(methylenedi-4,1-phenylene)bis-maleimide (BMI). The exemplary polycarbonate copolymer (DABPA-co-BHPM PC copolymer) shown is prepared from 2,2'-diallyl Bisphenol A (DABPA) and 4,4'-[1-methyl-4-(1-methylethyl)-1,3-cyclohexandiyl]bisphenol (BHPM). As shown in FIG. 1b, when the resulting Ene reaction product contains an olefin alpha to an aryl group, these groups are thought to further undergo a Diels Alder reaction with the remaining free olefin of the crosslinking agent resulting in a crosslinked polymeric material.

The terms "a" and "an" herein do not denote a limitation of quantity, but rather denote the presence of at least one of the referenced item. All ranges disclosed herein are inclusive and combinable.

The crosslinked polymeric material can be prepared from crosslinkable polymeric material and a crosslinking agent. The crosslinkable polymeric material comprises olefin groups within or pendent from the polymer backbone, and more specifically terminal olefin groups pendent from the polymer backbone ($-CH=CH_2$ as opposed to $-CH=CH-$). More specifically, the terminal olefins groups of the polymeric material are pendant from an aromatic group as an allylaromatic. For example, polycarbonates prepared from 2,2'-diallyl Bisphenol A (DABPA) contain allylaromatics having pendent olefin groups.

The crosslinkable polymeric material can include, for example, those of the following class: polycarbonates, polyamides, polyimides, polyetherimides, polyethylene sulfones, polyether sulfones, polyethylene ethers, polyethylene ketones, polyesters, polyacrylates, polyurethanes, polyarylene ethers, copolymers thereof, and the like.

The crosslinkable polymeric material generally comprises 1 to about 50 mole percent olefin functionality, specifically about 2 to about 10 mole percent, and yet more specifically about 2 to about 6 mole percent olefin functionality.

In one embodiment, the crosslinkable polymeric material is a polycarbonate copolymer exhibiting a high glass transition temperature and good film forming qualities. The polycarbonate copolymer can be prepared from a diol comprising at least one olefin group and 4,4'-[1-methyl-4-(1-methylethyl)-1,3-cyclohexandiyl]bisphenol (also identified as 1,3-bis(hydroxyphenyl)monoterpene or BHPM). Exemplary diols comprising at least one olefin group include 2,2'-diallyl Bisphenol A (DABPA), 4-(3-allyl-4-hydroxybenzyl)-2-allylphenol, bis(3-allyl-4-hydroxyphenyl)methanone, 4-(3-allyl-4-hydroxyphenylsulfonyl)-2-allylphenol, 4-(3-allyl-4-hydroxyphenylsulfinyl)-2-allylphenol, and the like.

In an exemplary embodiment, the polycarbonate copolymer is prepared from BHPM and DABPA having a mol fraction of DABPA from about 0.01 to about 1, specifically about 0.05 to about 0.75, and more specifically about 0.1 to about 0.4.

The crosslinking agent includes electron deficient olefin compounds comprising one or more adjacent electron withdrawing groups. Suitable electron withdrawing groups include carbonyl groups such as aldehyde, carboxylic acid, ester, amide, and ketone; nitrile groups; nitro groups; and the like. The crosslinking agent can comprise two, or more electron deficient olefin groups each comprising one or more adjacent electron withdrawing groups.

An exemplary group of crosslinking agents comprising electron deficient olefins include a compound comprising at least two maleimide groups linked via the nitrogen atom to a $C_1$-$C_{30}$ hydrocarbylene group. Exemplary crosslinking agents include 1,1'-(methylenedi-4,1-phenylene)bismalimide (BMI); 1,4-phenylene bismalimide; 1,4-di-1H-pyrrole-2,5-dione)butane; and the like.

As used herein, "hydrocarbyl" and "hydrocarbylene" refer to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl or hydrocarbylene residue, when so stated however, may contain heteroatoms over and above the carbon and hydrogen members of the substituent residue. Thus, when specifically noted as containing such heteroatoms, the hydrocarbyl or hydrocarbylene residue may also contain carbonyl groups, amino groups, hydroxyl groups, or the like, or it may contain heteroatoms within the backbone of the hydrocarbyl or hydrocarbylene residue.

Stoichiometric ratios of the crosslinking agent to the amount of olefin groups from the backbone of the polymeric material can be used. Other amounts include 0.5 to about 10 equivalents of crosslinking agent per olefin group of the polymeric material, specifically about 1 to about 5 equivalents, and yet more specifically about 1 to about 2 equivalents of crosslinking agent per olefin group. Suitable nonlinear optical (NLO) chromophores that can be used to form EO films include those that exhibit good chemical stability under conditions of electric field poling. Exemplary NLO chromophores include so-called high-$\mu\beta$ chromophores comprising and electron donor group bound to a pi electron connective system, which is in turn bound to an electron acceptor group. A suitable NLO chromophore includes LM 46M (4-((1E)-2-(5-(4-(N-ethyl-N-(2-methoxyethyl)amino)styryl)-3,4-dihexylthiophen-2-yl)vinyl)-2-(dicyanomethylene)-2,5-dihydro-5,5-dimethylfuran-3-carbonitrile).

The NLO chromophore can be selected to minimize any potential reaction between the chromophore and the crosslinkable polymeric material and/or crosslinking agent. By selecting, for example, sterically hindered chromophores, it is possible to crosslink the polymeric material without compromising the pi electron connective system of the chromophores. Such a selection can be made by one of ordinary skill in the art without undue experimentation.

The chromophore may be used in amounts of about 10 to about 35 weight percent based on the polymer, specifically about 15 to about 30 weight percent, and yet more specifically about 20 to about 25 weight percent.

Prepared solutions of crosslinkable polymeric material, crosslinking agent, chromophore, and optional solvent can be formed as thin curable films on a substrate, such as polymeric or silicon substrates. The solvent of the solution can be removed by evaporation, optionally with heating and/or vacuum to result in a crosslinkable film. The crosslinkable film can be heated to temperatures sufficiently above the Tg of the crosslinkable polymeric material so that poling can be used to induce the formation of an acentric dipolar lattice while the material is in a glassy state. Once the chromophores have been poled, the temperature is increased to induce crosslinking via Ene or Ene and Diels Alder reactions between the crosslinkable material and crosslinking agent.

The thin crosslinkable films can be formed by spin casting, dipping, spray coating, silk screening, doctor blading, ink jetting, and the like to form a thin film of the composition, more specifically spin casting. Solvents that are suitable for film forming include those that can solubilize the polymeric material, but are inert to the components of the film. Substrates on which the films are form may be of any material including, for example, polymeric or silicon substrates.

In an exemplary embodiment, the crosslinked film can be prepared by mixing a crosslinkable polymeric material comprising pendent olefin groups, a crosslinking agent, and NLO chromophore with a suitable solvent to form a mixture. The mixture is then applied to a substrate, either by spin coating, casting, dipping, etc., and then the solvent is allowed to evaporate to leave a crosslinkable film comprising the crosslinkable polymeric material, crosslinking agent, and chromophore. The crosslinkable film is heated to at or slightly above the glass transition temperature of the film and an electromagnetic field is then applied to the crosslinkable film to cause a poling of the chromophore present therein. The chromophore molecules align relative to the direction of the applied field. While maintaining the electromagnetic field, the crosslinkable film is heated to temperatures sufficient to induce crosslinking of the olefin groups of the polymeric material with the crosslinking agent by Ene and possibly even Diels Alder reactions. The crosslinking fixes the aligned chromophore molecules thereby providing a cured film having non-linear EO properties. It is believed that the crosslinking will provide an increase in the lifetime of the device after poling by maintaining the chromophore orientation longer than the corresponding non-crosslinked polymers.

The crosslinking of the crosslinkable polymeric material and crosslinking agent occurs under mild conditions at temperatures at or just above the glass transition temperature of the crosslinkable film. These temperatures are sufficient to provide cure while at the same time low enough so that decomposition of the other components of the film does not occur. Temperatures suitable to induce crosslinking can be about 150 to about 350° C., specifically about 200 to about 300° C., and more specifically about 200 to about 275° C.

The time of heating to induce crosslinking is dependent upon the crosslinkable polymeric material employed and the crosslinking agent used. Exemplary reaction times to induce crosslinking can be about 2 to about 60 minutes, specifically about 3 to about 20 minutes, more specifically about 4 to about 10 minutes, and yet more specifically about 2 to about 5 minutes.

The crosslinked films comprising oriented NLO chromophores can be used for a variety of applications, including for example, electro-optical waveguide materials, Mach Zehnder modulators, optical switches, variable optical attenuators, narrow band notch and bandpass filters, digitally tuned gratings, optical frequency mixers, and electro-optical devices including organic light-emitting diodes and photo diodes.

In another embodiment, the crosslinkable polymeric material in combination with a crosslinking agent, but without the chromophores, can find use in non-EO applications as a coating material with on-demand cure.

EXAMPLES

Examples 1-4

Synthesis of DABPA-co-BHPM PC Copolymer

DABPA-co-BHPM PC copolymers comprising varying amounts of pendent olefin groups were prepared by reacting a mixture of 1,3-bis(hydroxyphenyl)monoterpene (BHPM, internally prepared), and 2,2'-diallylbisphenol A (DABPA, n=0.1, 0.2, 0.3, and 0.4, Aldrich Chemical Co., purified prior to use) with excess phosgene, and in the presence of pyridine or triethylamine. An amount of 1.5 mol percent of 4-Cumylphenol (Aldrich Chemical Co.) was used as a chain stopper.

Alternatively, the copolymers were prepared under interfacial phosgenation conditions using methylene chloride as the solvent, aqueous sodium hydroxide as the base and (0.1-1 mol %) triethylamine as the catalyst. The processes used for the preparation of the copolymers were not optimized and exhibited a slight excess of BHPM relative to the mole fraction of DABPA, presumably due to a difference in the monomer reactivity ratios under the condensation polymerization conditions used.

Table 1 summarizes the weight average molecular weight ($M_w$), the number average molecular weight ($M_n$), and the polydispersity index (PDI, $M_w/M_n$) for the DABPA-co-BHPM PC copolymers obtained by gel permeation chromatography (GPC).

TABLE 1

| Example | Mol Fraction DABPA | $M_w$ | $M_n$ (Exp) | $M_n$ (Theory) | $M_w/M_n$ |
|---|---|---|---|---|---|
| 1 | 0.1 | 11664 | 5598 | 23383 | 2.084 |
| 2 | 0.2 | 15148 | 5794 | 23279 | 2.615 |
| 3 | 0.3 | 17481 | 7142 | 23175 | 2.448 |
| 4 | 0.4 | 28354 | 8677 | 23071 | 3.268 |

A differential scanning calorimetry (DSC) study was undertaken to evaluate the thermal cross-linking of the DABPA-co-BHPM polycarbonate copolymers of Examples 1-4 using 1,1'-(methylenedi-4,1-phenylene)bismalimide as the crosslinking agent. The DSC thermal analysis was completed using a Perkin-Elmer DSC7 differential scanning calorimeter. 1,1'-(Methylenedi-4,1-phenylene)bismalimide (BMI, Aldrich Chemical Co.) was added without further purification to each polycarbonate copolymer formulation to obtain a theoretical stoichiometry of 0.5 allyl equivalents per BMI. All sample copolymer formulations were prepared by evaporatively casting films of filtered (Whatman Uniprep™ syringeless filters, 0.45 micrometer polytetrafluoroethylene membrane) $CH_2Cl_2$ solutions containing dissolved copolymer and BMI. All DSC sample measurements were referenced to an indium standard (melting point (mp) 156.60° C., $\Delta H_r$=28.45 J/g) using a dual pan configuration under a nitrogen ($N_2$) purge gas. Typical sample masses ranged from 10 to 15 milligrams (mg), and all samples were compressed into pellets sized to fit an aluminum sample pan to maximize heat flow while minimizing thermal lag in the sample. Typical cycles for the first heat and second heat are listed in Table 2 below. DSC scanning kinetics data collection and manipulation was made using the Pyris V5.00.02 software package. No attempt was made to correct the data generated by normalizing it relative to $M_w$, $M_n$, composition, or mass variations between sets of replicate runs.

TABLE 2

Typical DSC experimental heat flow cycles (endothermic event up)

| Heat | Cycle Step | Step Description |
|---|---|---|
| 1 | 1 | Hold for 2.0 min at 25.00° C. |
| 1 | 2 | Heat from 25.00° C. to 425.00° C. at 10.00° C./min |
| 1 | 3 | Cool from 425.00° C. to 25.00° C. at 10.00° C./min |
| 2 | 4 | Hold for 5.0 min at 25.00° C. |
| 2 | 5 | Heat from 25.00° C. to 425.00° C. at 10.00° C./min |
| 2 | 6 | Cool from 425.00° C. to 25.00° C. at 10.00° C./min |

In this screening model study, the thermal cross-linking of DABPA-co-BHPM polycarbonates with BMI was probed in situ using DSC thermal analysis. As indicated in FIG. 1a, DABPA-co-BHPM polycarbonates are thermoset at temperatures from 130-200° C. as electron deficient BMIs react via an Ene addition to the electron rich diene in the form of an ortho-allylphenyl function. The first and second that for each of the DABPA-co-BHPM/BMI formulations Examples 1-4 is shown in FIGS. 2 and 3, respectively. The $T_g$ for the undoped and uncured polycarbonate copolymers is summarized in Table 3.

TABLE 3

| Example | Polymer | Tg (° C.) |
|---|---|---|
| Control | BHPM | 250 |
| Example 1 | DABPA-co-BHPM (n = 0.1 DABPA) | 215 |
| Example 2 | DABPA-co-BHPM (n = 0.2 DABPA) | 185 |
| Example 3 | DABPA-co-BHPM (n = 0.3 DABPA) | 172 |
| Example 4 | DABPA-co-BHPM (n = 0.4 DABPA) | 159 |

An interpretation of the results for the 1$^{st}$ and 2$^{nd}$ heat of the DABPA-co-BHPM PC copolymer formulations is as follows. In FIG. 2, heat flow is seen to increase as the temperature is ramped, consistent with an upward slope of the heating curve. At T=156° C., the unreacted BMI dispersed within cast films of the DABPA-co-BHPM PC copolymer formulations is undergoing an endothermic phase transition as the solid BMI melts. The integrated area under each curve increases roughly in proportion to the concentration of the solid BMI dispersed within the polycarbonate copolymer formulation, that is, the concentration of dispersed BMI increases from heating curve 1 to 4 (n=0.1-0.4 DABPA, respectively). This transition is reproducible between the different polycarbonate compositions, occurring at the reported melting point for 1,1'-(methylenedi-4,1-phenylene)bismaleimide (mp=156-158° C.), and this in turn is consistent with a discrete, low molecular weight component dispersed within the copolymer matrix.

After the BMI has melted, heating continues until the onset of curing at approximately 185° C., as suggested by a broad, shallow exothermic event evident in all of the heating curves. This interpretation is consistent with several additional observations. First, the $T_g$ associated with any of the unreacted polycarbonate copolymers (Table 3) were not observed. Secondly, there is no hysteresis observed in the heating curve for the $2^{nd}$ heat (FIG. 3), that is, neither an endothermic event associated with the melting of BMI or an exothermic event associated with thermal curing are observed in the $2^{nd}$ heat. Indeed, it should also be readily apparent that there are no observable transitions associated with unreacted DABPA-co-BHPM PC copolymers, e.g., $T_g$ (Table 3). This result implies that a thermal cross-linking event has occurred, resulting in a cross-linked network. The results further suggest BMI acts as a cross-linking agent to form a polymer network that is distinct from the original starting materials used to form the network. The resultant polymer network does not exhibit any detectable $T_g$ under the thermal treatment describe using DSC methods.

Example 5

$T_g$ of Doped DABPA-co-BHPM PC

Samples of DABPA-co-BHPM PC containing varying amounts of DABPA were doped with chromophore LM 46M at 25 weight percent loadings and measured for Tg. A distinct trend in the reduction of the glass transition temperature was observed with the incorporation of the chromophore.

TABLE 4

| Example 5 (Mole fraction of DABPA) | Tg (° C.) of copolymer doped with 25 wt. % chromophore |
|---|---|
| 0.1 | 133 |
| 0.2 | 122 |
| 0.3 | 110 |
| 0.4 | 100 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for crosslinking a polymer, comprising:
    reacting i) a crosslinkable polymeric material comprising olefin groups and ii) a crosslinking agent comprising electron deficient olefin groups, and wherein the crosslinking agent comprises at least two maleimide groups linked via the nitrogen atom to a $C_1$-$C_{30}$ hydrocarbylene group; that reacts with the crosslinkable polymeric material via an ene reaction, a Diels Alder reaction, or a combination of an ene reaction and a Diels Alder reaction, at a temperature at which crosslinking occurs.

2. The method of claim 1, wherein the crosslinkable polymeric material is polyamide, polyimide, polyetherimide, polyethylene sulfone, polyether sulfone, polyethylene ether, polyethylene ketone, polyester, polyacrylate, polyurethane, epoxide polymer, polyether, polycarbonate, or a combination of the foregoing.

3. The method of claim 2, wherein the polycarbonate is a copolymer of a bisphenol compound comprising two olefin groups and a 4,4'-[1-methyl-4-(1-methylethyl)-1,3-cyclohexandiyl]bisphenol.

4. The method of claim 3, wherein the bisphenol is 2,2'-diallylbisphenol A.

5. The method of claim 1, wherein the crosslinking agent is 1,1'-(methylenedi-4,1-phenylene)bismalimide; 1,4-phenylene bismaleimide; 1,4-(di-1H-pyffole-2,5-dione)butane; or a combination thereof.

6. The reaction product formed according to the method of claim 1.

7. A method for cros slinking a polymer, comprising:
    reacting i) a polycarbonate copolymer prepared from a bisphenol compound comprising two olefin groups and a 4,4'-[1-methyl-4-(1-methylethyl)- 1,3-cyclohexandiyl]bisphenol and ii) 1,1'-(methylenedi-4,1-phenylene)bismalimide, 1,4-(phenylene bismalimide, 1,4-di-1H-pyrrole-2,5-dione)butane, or a combination thereof, that reacts via an ene reaction, a Diels Alder reaction, or a combination of an ene reaction and a Diels Alder reaction, at a temperature at which crosslinking occurs.

8. The reaction product formed according to the method of claim 7.

* * * * *

UNITED STATES PATENT AND TRADEMARK OFFICE
CERTIFICATE OF CORRECTION

PATENT NO. : 7,390,857 B2
APPLICATION NO. : 10/928939
DATED : June 24, 2008
INVENTOR(S) : Cella et al.

Page 1 of 1

It is certified that error appears in the above-identified patent and that said Letters Patent is hereby corrected as shown below:

In Column 4, Line 25, delete "Tg" and insert -- $T_g$ --, therefor.

In Column 6, Line 44, delete "that" and insert -- heat --, therefor.

In Column 6, Line 52, under "TABLE 3", delete "Tg" and insert -- $T_g$ --, therefor.

In Column 7, Line 39, delete "Tg." and insert -- $T_g.$ --, therefor.

In Column 7, Line 45, under "TABLE 4", delete "Tg" and insert -- $T_g$ --, therefor.

In Column 8, Line 40, in Claim 7, delete "cros slinking" and insert -- cross linking --, therefor.

Signed and Sealed this

Sixteenth Day of June, 2009

JOHN DOLL
*Acting Director of the United States Patent and Trademark Office*